United States Patent
Recio et al.

(10) Patent No.: US 12,098,322 B2
(45) Date of Patent: Sep. 24, 2024

(54) DILUENT WITH GLYCOL ETHER FOR SOLIDS-CONTROL FLUID IN A WELLBORE

(71) Applicant: Halliburton Energy Services, Inc., Houston, TX (US)

(72) Inventors: Antonio Recio, Kingwood, TX (US); Jay Deville, Houston, TX (US); Michael Wayne Sanders, Houston, TX (US); Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/158,398

(22) Filed: Jan. 23, 2023

(65) Prior Publication Data

US 2024/0247177 A1   Jul. 25, 2024

(51) Int. Cl.
*E21B 43/27* (2006.01)
*C09K 8/24* (2006.01)
*E21B 43/20* (2006.01)

(52) U.S. Cl.
CPC ............. *C09K 8/24* (2013.01); *E21B 43/27* (2020.05); *E21B 43/20* (2013.01)

(58) Field of Classification Search
CPC ............ C09K 8/24; E21B 43/27; E21B 43/20
See application file for complete search history.

(56) References Cited

U.S. PATENT DOCUMENTS

| | | | |
|---|---|---|---|
| 4,614,235 A | 9/1986 | Keener et al. | |
| 4,719,021 A | 1/1988 | Branch | |
| 4,830,725 A | 5/1989 | Berninger et al. | |
| 4,941,981 A | 7/1990 | Perricone et al. | |
| 4,963,273 A | 10/1990 | Perricone et al. | |
| 5,120,708 A | 6/1992 | Melear et al. | |
| 5,635,458 A | 6/1997 | Lee et al. | |
| 11,807,809 B2 * | 11/2023 | Nguyen | C09K 8/5086 |
| 2004/0261997 A1 * | 12/2004 | Nguyen | C09K 8/12 166/295 |
| 2006/0076138 A1 | 4/2006 | Dusterhoft et al. | |
| 2009/0099048 A1 * | 4/2009 | Zhao | C10M 133/40 508/202 |
| 2010/0282465 A1 | 11/2010 | Weaver et al. | |
| 2014/0209391 A1 * | 7/2014 | Jamison | E21B 21/06 175/217 |
| 2015/0252638 A1 | 9/2015 | Richards et al. | |
| 2016/0108306 A1 * | 4/2016 | Weaver | C09K 8/685 166/280.2 |

(Continued)

OTHER PUBLICATIONS

Unpublished U.S. Appl. No. 17/556,656, filed Dec. 20, 2021. In accordance with the Waiver of the Copy Requirements in 37 CFR 1.98 for Cited Pending U.S. Patent Applications, 1287 O.G. 163 (Oct. 19, 2004).

(Continued)

*Primary Examiner* — Silvana C Runyan
(74) *Attorney, Agent, or Firm* — Kilpatrick Townsend & Stockton LLP

(57) ABSTRACT

A solids-control fluid for controlling flow of solids in a subterranean formation is disclosed herein. The solids-control fluid can include a diluent and a curable resin. The diluent can include a glycol ether. The curable resin can be dispersed within the diluent for controlling flow of solids in the subterranean formation.

17 Claims, 4 Drawing Sheets

(56) References Cited

U.S. PATENT DOCUMENTS

| | | |
|---|---|---|
| 2016/0290115 A1 | 10/2016 | Fleming et al. |
| 2017/0226405 A1* | 8/2017 | Weaver, Jr. ............. E21B 43/20 |
| 2021/0002444 A1 | 1/2021 | Dwarakanath et al. |
| 2021/0115323 A1* | 4/2021 | Shumway ................ C09K 8/32 |
| 2022/0017812 A1* | 1/2022 | Reyes ..................... C09K 8/06 |

OTHER PUBLICATIONS

International Patent Application No. PCT/US2023/084748, International Search Report and Written Opinion mailed Apr. 26, 2024, 11 pages.

\* cited by examiner

DILUENT WITH GLYCOL ETHER FOR SOLIDS-CONTROL FLUID IN A WELLBORE

TECHNICAL FIELD

The present disclosure relates generally to wellbore operations and, more particularly (although not necessarily exclusively), to diluents with a glycol ether for solids-control fluids usable in a wellbore for controlling flow of solids.

BACKGROUND

A wellbore can be formed in a subterranean formation for extracting produced hydrocarbons or other suitable materials. One or more wellbore operations can be performed with respect to the wellbore. The operations can include drilling to form the wellbore, extracting produced hydrocarbons from the wellbore, etc. The wellbore operations can include or otherwise involve injecting fluid, such as water, proppant, mud, and the like, into the wellbore, into the subterranean formation, or into a combination thereof. Injecting fluid into the wellbore or into the subterranean formation can cause solids, such as fine particulates and sand, in the subterranean formation to dislodge or to otherwise flow. The flow solids can cause damage to downhole equipment or other suitable problems within the wellbore, which may result in well shutdown or costly repairs. Higher production rates, along with other detrimental processes, can cause the formation to break down and, if the production rates are sufficiently high, to allow the produced fluids to transport solids from the subterranean formation into the wellbore. Other control fluids that control flow of solids with respect to the subterranean formation may be unsafe or inefficient. For example, the other control fluids can cause a decline in production of the wellbore.

DETAILED DESCRIPTION

Figure 1:
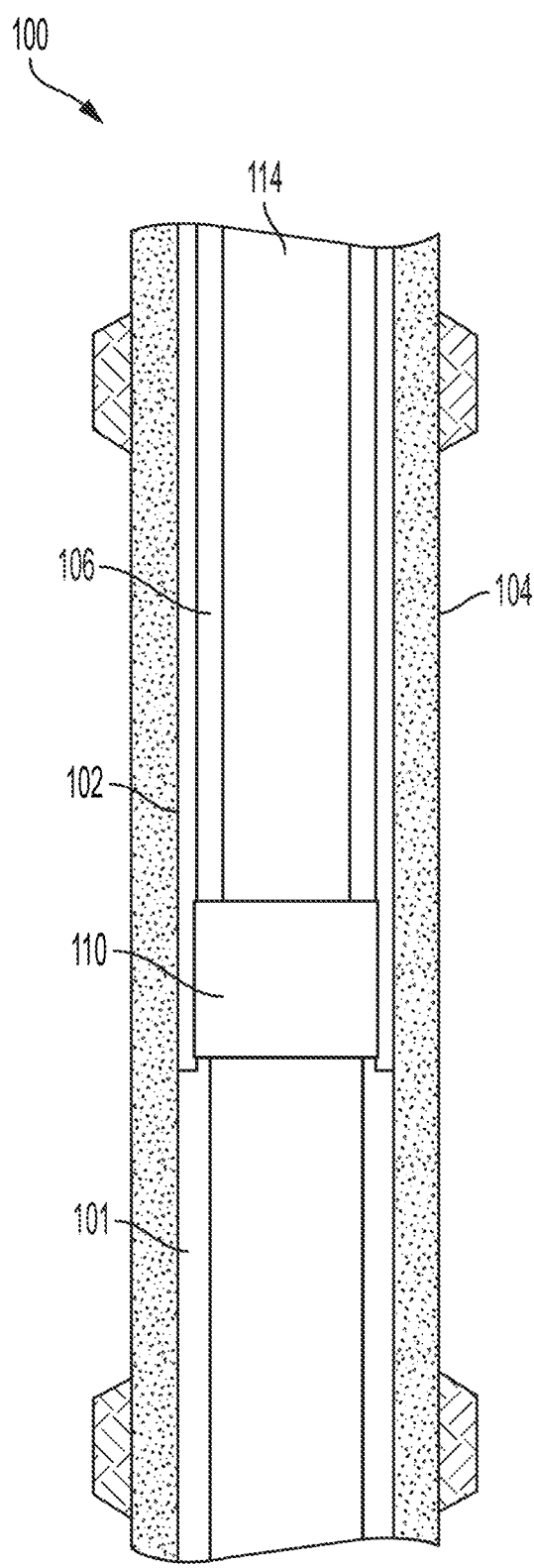
FIG. 1 is a schematic of a well system that can use a solids-control fluid in a subterranean formation to control flow of solids with respect to the subterranean formation according to examples of the present disclosure.

Certain aspects and examples of the present disclosure relate to a diluent that includes a glycol ether for a solids-control fluid positionable in a wellbore. The wellbore may be positioned in a subterranean formation for extracting produced material, such as oil, gas, other hydrocarbon material, water, and the like, from the subterranean formation. The solids-control fluid may be positioned in the wellbore, or in the subterranean formation via the wellbore, to control flow of solid particulates in the wellbore, the subterranean formation, or a combination thereof. For example, the solids-control fluid may consolidate to control flow of solids including fine particulates of the subterranean formation, sand of the subterranean formation, clay of the subterranean formation, other suitable solids, or a combination thereof. In another example, the solids-control fluid may consolidate to control flow of proppants within fractures of the subterranean formation or mitigate proppant flowback out of the subterranean formation. The glycol ether may be or include a class of chemical compounds that may include ethers based on one or more different types of glycols such as ethylene glycol, propylene glycol, and the like. Examples of the glycol ether can include ethylene glycol monobutyl ether, polyalkylene glycol monobutyl ether, and the like. The diluent may be added to the solids-control fluid to dilute the solids-control fluid, to increase an effectiveness (e.g., compared to other solids-control fluids) of the solids-control fluid in various environments, and the like.

In some examples, a wellbore can be formed in a subterranean formation that can include varying amounts of clay, sand, and other solid material. Each type of solid material may flow differently with respect to the wellbore and the subterranean formation. For example, the sand may dislodge from the subterranean formation in smaller particulates than particulates of clay dislodging from the subterranean formation. In some examples, solid particulates dislodging from the subterranean formation and flowing into the wellbore can be referred to as flowback and can cause problems. For example, production rates of the wellbore can be reduced, quality of produced material can be reduced, and the like.

In some examples, remediation of lateral length wellbores, such as those with length exceeding 10 ft (3.048 m), that have experienced formation damage resulting in excessive sand production can be challenging to treat with chemical composites. Other resin formulations may include internal hardeners that are thermally or internally activated. Placement of internally activated resin formulations can be challenging in long laterals because, as the pump time increases, the chances of the resin system hardening in the wellbore may increase, for example exponentially. Loss of fluid communication in the wellbore as a result from premature activation of the resin formulation may be detrimental to the life of the wellbore. Accordingly, a chemical sand consolidating treatment that separates the hardener or activator from the polymeric resin can be used.

Multi-stage fluid placement can involve a set of challenges that can include density matching to ensure that each subsequent stage displaces predecessors thereof. In some examples, activator reactivity, miscibility, and contact time can be considered to optimize the success of the sand consolidation or other consolidation of solids in the subterranean formation or the wellbore. A multi-stage chemical sand consolidating treatment can be used to address the challenges. The treatment can involve placing a polymeric resin into a hydrocarbon-laden subterranean reservoir and, in a separate stage, the chemical hardener or activator can be introduced to the polymeric resin.

A solids-control fluid with a diluent having glycol ether and a solids-control agent (e.g., polyalkylene glycol) can be used to control flow of solids with respect to the wellbore and the subterranean formation. For example, incorporating a glycol ether, such as polyalkylene glycol monobutyl ether, into the diluent of the solids-control fluid, which may be or include a resin-type material, can facilitate treatment, such as flow-control, of a high clay-content subterranean formation and the treatment of long lateral wellbore intervals. High clay content may involve contents of clay exceeding 10%, 15%, 20%, or more, and long lateral wellbore intervals may involve lateral wellbore intervals of length 20 ft (6.096 m), 30 ft (9.144 m), 40 ft (12.192 m), or more. Other resin formulations may not be capable of treating high-clay-content formations or long lateral wellbore intervals.

In some examples, one or more different techniques or sequences of techniques can be used to control flow of solids with respect to the subterranean formation and the wellbore. In one particular example (e.g., with a clay content of the subterranean formation being less than about 5%, etc.), a brine pre-flush solution can be injected into the wellbore. The brine pre-flush solution may have a volume of two pore volumes, three pore volumes, four pore volumes, five pore volumes, or more, and the brine pre-flush solution may include between 5-40% NaCl and other components for the brine pre-flush solution. A solids-control fluid can be injected into the wellbore, and the solids-control fluid can have a volume of between one and five or more pore volumes. The solids-control fluid may be or include a polymeric furfuryl resin mixture that includes a resin and a glycol ether diluent in a ratio between 1.0:5.0 and 5.0:1.0 of resin to diluent. A brine spacer can be injected into the wellbore, and the brine spacer can have a volume of between one to five or more pore volumes. In some examples, the brine spacer can have a similar or identical composition and concentration as the brine pre-flush. A resin activator can be injected into the wellbore to activate the solids-control fluid to control flow of solids in the wellbore, in the subterranean formation, or a combination thereof. The resin activator can have a volume of between one and 32 or more pore volumes, and the resin activator may include HCl in concentrations between 1% and 20% or more and may include NaCl in concentrations between 5% and 40% or more. A brine post-flush can be injected into the wellbore, and the brine post-flush may be similar or identical to the brine pre-flush.

In another example (e.g., with a clay content of the subterranean formation exceeding about 5%, etc.), a brine pre-flush solution can be injected into the wellbore as discussed in the previous example. The solids-control fluid can be injected into the wellbore, and the solids-control fluid can have a volume of between two and 20 or more pore volumes. The solids-control fluid may be or include a polymeric furfuryl resin mixture that includes a resin and a glycol ether diluent in a ratio between 1.0:5.0 and 5.0:1.0 of resin to diluent. A brine spacer can be injected into the wellbore as discussed in the previous example, and a resin activator can be injected into the wellbore to activate the solids-control fluid to control flow of solids as discussed in the previous example. A brine post-flush can optionally be injected into the wellbore, and the brine post-flush may be similar or identical to the brine pre-flush.

In another example, (e.g., with a clay content of the subterranean formation exceeding about 5%, etc.), a brine pre-flush solution can be injected into the wellbore as discussed in the previous example. The solids-control fluid can be injected into the wellbore, and the solids-control fluid can have a volume of between two and 20 or more pore volumes. In some examples, the volume of the solids-control fluid may be about five pore volumes. The solids-control fluid may be or include a polymeric furfuryl resin mixture that includes a resin and a glycol ether diluent in a ratio between 1.0:5.0 and 5.0:1.0 of resin to diluent. In some examples, the ratio of resin to diluent may be approximately 1.06:1.0. A brine spacer can be injected into the wellbore as discussed in the previous example, and a resin activator can be injected into the wellbore to activate the solids-control fluid to control flow of solids. In some examples, the resin activator may include an acidic fluid with pH less than about 6.0 pH and a volume of between 1 and 12 pore volumes or more. A brine post-flush can optionally be injected into the wellbore, and the brine post-flush may be similar or identical to the brine pre-flush.

In some examples, the brine pre-flush can include a greater than 1 M concentration of a halogenated Group I metal salt. In some examples, the concentration can be about 2.7 M of aqueous sodium chloride. Additionally or alternatively, the brine pre-flush solution may contain a wetting agent that can include quaternized alkyl amine salts and quaternized polyamine salts that can render the formation oil-wet or may otherwise reduce an affinity of the formation to water. In some examples, the wetting agent can include cetyl, dimethyl, benzyl ammonium bromide or chloride. The wetting agent may be used in a concentration range from 0.025 to 10 wt. % or more. Additionally, an example of the polymeric furfuryl alcohol resin mixture can include a combination of a preformed furfuryl alcohol polymer to a viscosity spec range of 400 centipoise +/−300 centipoise, though other resins can be used with the diluent with glycol ether.

In some examples, the diluent can include monoethylene glycol and a polyalkylene glycol material. The polyalkylene materials can be or include alcohol-initiated oligomers that can include similar or identical amounts by wt. % of oxyethylene and oxypropylene functionalization that include a hydroxyl terminus. The polyalkylene glycols can vary in number average molecular weight from about 270 to about 3930, can vary in kinematic viscosity range from about 0.010 centipoise to about 1.0 centipoise at about 100° F. (about 37.78° C.), and a cloud point ranging from about 131° F. (about 55° C.) to about 149 F (about 65° C.), or greater than about 4 wt. % brine. The diluent, or any component thereof, can have an average molecular weight of about 520, a kinematic viscosity of about 0.025 centipoise at about 100° F. (about 37.78° C.), and a cloud point of about 135° F. (about 57.22° C.). Additional diluent components that can be combined with the polyalkylene glycol can include an aromatic aldehyde (e.g., benzaldehyde, anisaldehyde, trimethoxy benzaldehyde, halogenated benzaldehyde, etc.), a heteroaromatic aldehyde (e.g., Furfural, Pyridine carboxaldehyde, Pyrrole carboxaldehyde, Thiophene carboxaldehyde, furan carboxaldehyde, etc.), an aromatic alcohol acetate ester (e.g., phenyl acetate, furfuryl alcohol acetate, etc.), an alkyl acetate ester (e.g., butyl acetate, hexyl acetate, etc.), an aromatic alcohol (e.g., phenol, hydroxypyridine, benzyl alcohol, furfuryl alcohol, pyridinemethanol, etc.), an aromatic ester (e.g., benzyl benzoate, etc.), an ether alcohol mixture (e.g., monoalkyl ethylene glycol, monobutyl ethylene glycol, polyethyleneglycol monobutyl ether, etc.), ethylene glycol derivatives (e.g., monoethyl glycol, polyethylene glycol, etc.), or any mixtures thereof. In a particular example, the diluent can include a combination of polyalkylene glycol and monoethylene glycol, with a 7:3 ratio of polyalkylene glycol to monoethylene glycol.

Additionally, a docking agent can be added to improve the adhesion of the resin to the formation minerals. Examples of docking agents can include a class of alkylaminosilane materials including 3-aminopropyltrimethoxysilane (APTMS), N-(6-aminohexyl)aminomethyltriethoxysilane (AHAMTES), N-(2-aminoethyl)-3-aminopropyltriethoxysilane (AEAPTES), or N-(2-aminoethyl)-3-aminopropyltrimethoxysilane (AEAPTMS). The concentration of the docking agent can range from about 0.025 wt. % to about 10 wt. %. The solids-control fluid can have various ratios of resin to diluent. For example, the ratios can range from, in units of parts, about 10:1 to about 1:10.

The brine spacer can include a concentration exceeding 1 M of a halogenated Group I metal salt. In a particular example, the brine spacer can have a 2.7 M concentration of aqueous sodium chloride, though other concentrations are possible.

In some examples, the resin activator can include an aqueous halogenated amine acid salt mixture. The resin activator mixture may not exceed more than about five times the volume of polymeric furfuryl alcohol resin mixture exposed to the formation. The aqueous halogenated amine acid salt can include an alkanolamine and a mineral acid such as hydrochloric acid, sulfuric acid, phosphoric acid, nitric acid, etc. Examples of alkanolamines can include monoethanolamine, monoisopropylamine, diethanolamine, triethanolamine, tetraethanol ethylene diamine, and the like. An example of molar ratios of the aqueous halogenated amine acid salt mixtures can include about 16:1 acid to alkanolamine, though ratios of about 11:1, about 4:1, and about 2.95:1 acid to alkanolamine are possible. The aqueous halogenated amine acid salt mixture can include an alkanolamine, a mineral acid, and an anti-corrosive formulation. Anti-corrosion additives may be selected from a mixture of acetylenic alcohols, aromatic or aliphatic aldehydes, alkylphenones, alkylated bisphenol compounds, amides, amines, quaternary amine salts, amine substituted heterocycles, imines, iminium salts, triazoles, pyridine and or pyridinium derivatives, quinoline and quinoline analogs, thiourea-based compounds, thiosemicarbazides, thiocyanates, and the like. Anti-corrosion additives can be added in a range of about 0.04 to about 5.5 wt. or wt. %, about 0.4 to about 2.5 wt. or wt. %, or about 0.5 to about 1.25 wt. or wt. %. Additionally, the aqueous halogenated amine acid salt mixture can include an anti-corrosive additive intensifier. The anti-corrosive additive intensifier may be selected from formic acid, potassium iodide, antimony oxide, copper iodide, sodium iodide, lithium iodide, aluminum chloride, bismuth oxide, calcium chloride, magnesium chloride, any combination thereof, or the like. The intensifier can be added in a range from about 0.05 to about 4.5 wt. %, between about 0.1 to about 1.5 wt. %, or the like. Alternative aqueous halogenated amine acid salts can include combinations of a mineral acid and an amino acid as the amine source.

The brine post-flush solution can include a concentration exceeding 1 M of a halogenated Group I metal salt. In some examples, the brine post-flush solution can include a 2.7 M concentration of aqueous sodium chloride.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic of a well system 100 that can use a solids-control fluid in a subterranean formation to control flow of solids with respect to the subterranean formation according to examples of the present disclosure. The well system 100 can include a wellbore 102 that can extend through a subterranean formation 104 that can include hydrocarbon material such as oil, gas, coal, or other suitable material. In some examples, a casing string 106 can extend from a well surface into the subterranean formation 104. The casing string 106 can provide a conduit through which fluids, such as solids-control fluids and production fluids produced from the subterranean formation 104, can travel to the well surface. The casing string 106 can be coupled to walls of the wellbore 102 via cement or other suitable coupling material. For example, a cement sheath can be positioned or formed between the casing string 106 and the walls of the wellbore 102 for coupling the casing string 106 to the wellbore 102. The casing string 106 can be coupled to the wellbore 102 using other suitable techniques. In some examples, the wellbore 102 may not include the casing string 106, or the cement sheath, and, instead, a wall of the wellbore 102, or a portion thereof, may be or otherwise include the subterranean formation 104.

The well system 100 can include at least one well tool 110 that can be positioned in the wellbore 102. The well tool 110 can be coupled to a wireline 114, a slickline, or coiled tubing that can be deployed into the wellbore 102. The wireline 114, the slickline, or the coiled tube can be guided into the wellbore 102 using, for example, a guide or winch. In some examples, the wireline 114, the slickline, or the coiled tube can be unwound from around a reel to be deployed into the wellbore 102. In some examples, the well tool 110 can include a packer or other suitable well tool that can be used to isolate one or more intervals of the wellbore 102 such as interval 101. The well tool 110 can expand radially outward, actuate, or otherwise perform suitable tasks for isolating the interval 101 of the wellbore 102 from other portions of the wellbore 102.

The interval 101 of the wellbore can include a subset of the wellbore 102. A wall of the wellbore 102 in the interval 101 can include a casing string 106 having perforations, such as for hydraulic fracturing or other similar wellbore operations, for accessing the subterranean formation 104. In some examples, the wall of the wellbore 102 in the interval 101 can alternatively be or otherwise include the subterranean formation 104. For example, the interval 101 may not include a casing string 106 or other similar component positioned in the wellbore 102. The interval 101 can be isolated, for example using the well tool 110, for performing one or more wellbore operations. For example, the interval 101 can be isolated for performing stimulation operations, for injecting solids-control fluids into the subterranean formation 104 for controlling flow of solids, such as sand, fine particulates, clays, or other suitable solids, in the subterranean formation 104, or for performing other suitable wellbore operations.

In some examples, the well system 100 can be used to perform one or more wellbore operations. The operations can include stimulation or other suitable or similar wellbore operations that may interact with the subterranean formation 104. For example, proppant, aqueous fluid, or other suitable material can be injected into the subterranean formation 104 via the interval 101 of the wellbore 102. Injecting the proppant, the aqueous fluid, or other suitable into the subterranean formation 104 may allow an increased amount of hydrocarbon material to be accessible (e.g., compared to not using the proppant or aqueous fluid) to the well system 100. Additionally, injecting the proppant, the aqueous fluid, or other material into the subterranean formation 104 may cause solids, such as sand, fine particulates, clays, or the like, to loosen or to potentially migrate, in some examples, into the wellbore 102. Migrating solids may negatively impact the wellbore operations, for example, by reducing a productiveness or an efficiency of the wellbore operations.

A solids-control fluid can be injected into the wellbore 102 for controlling the flow or migration of solids with respect to the wellbore 102. For example, the solids-control fluid, which may include a diluent and a curable resin or, in some cases, a tackifying agent, can be injected into the subterranean formation 104 via the interval 101 of the wellbore 102. The solids-control fluid can be activated while positioned in the subterranean formation 104, or while positioned in other suitable locations with respect to the wellbore 102, and the activated solids-control fluid can control the flow or migration of solids in the well system 100. For example, the solids-control fluid may combine with or otherwise adhere to a group of solids in the subterranean formation 104. The solids may include fine particulates, such as solids in the subterranean formation 104 and having a diameter below a threshold such as about 40 microns or about 0.016 inches, sand, such as solids having a diameter above the threshold or other suitable sand-type solids), clays, or other suitable solids of the subterranean formation 104. By combining with or adhering to the solids, the solids-control fluid may adjust flow rates of the solids in the subterranean formation 104. For example, the solids-control fluid may mitigate an amount of solids that may detach or that may be produced from the subterranean formation 104.

Figure 2:
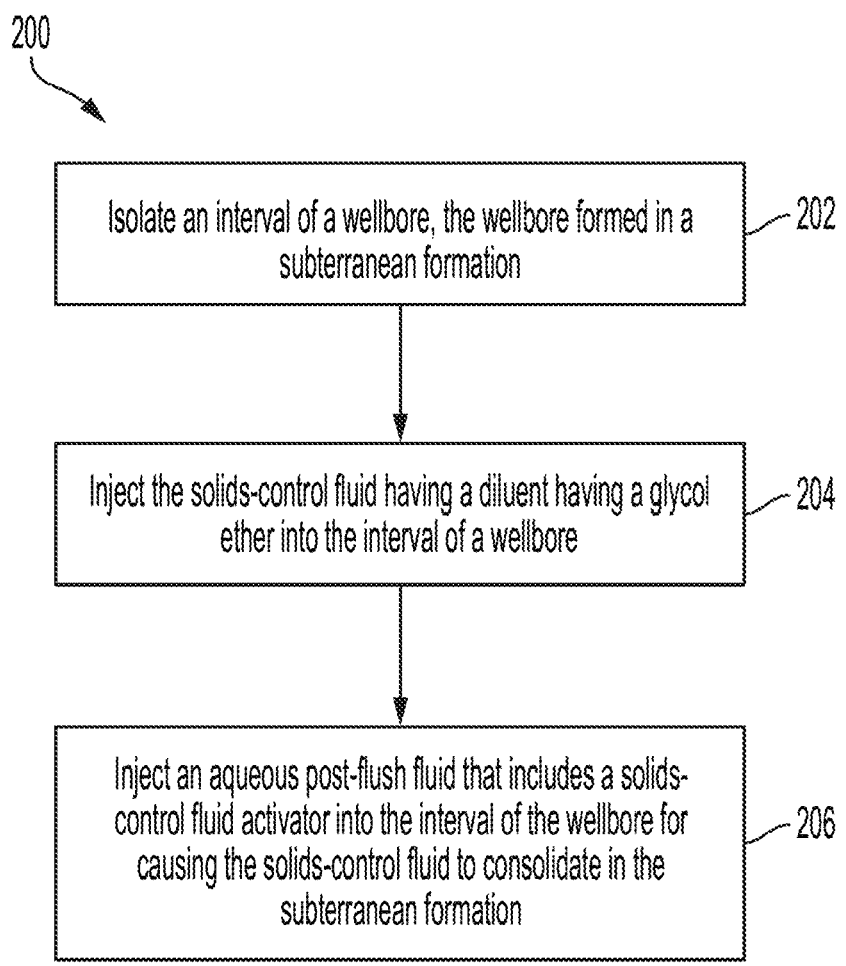
FIG. 2 is a flowchart of a process to control flow of solids in a subterranean formation using a solids-control fluid with a diluent having a glycol ether according to examples of the present disclosure.

FIG. 2 is a flowchart of a process 200 to control flow of solids in a subterranean formation using a solids-control fluid with a diluent having a glycol ether according to examples of the present disclosure. At block 202, an interval, such as the interval 101, of a wellbore 102 is isolated. The wellbore 102 can be formed in a subterranean formation 104. The interval of the wellbore 102 may include a subset of the wellbore 102, and a wall of the wellbore 102 in the isolated interval may include the subterranean formation 104, the casing string 106 having perforations for accessing the subterranean formation 104, or other suitable material. In some examples, the interval of the wellbore 102 can be isolated using a packer or other suitable well tool for isolating a portion of the wellbore 102.

In some examples, an aqueous pre-flush fluid can be injected into the interval of the wellbore 102. The aqueous pre-flush fluid can include a brine or other suitable base-fluid. The aqueous pre-flush fluid may further include a docking agent or a wetting agent. In some examples, the wetting agent can include an oil-wetting surfactant or other suitable wetting agents. For example, the wetting agent can include quaternized alkyl amine salts or quaternized polyamine salts that render the subterranean formation oil-wet. The wetting agent may be used in a concentration range from about 0.025 to about 10 wt. %, a concentration from about 0.1 to about 5 wt. %, a concentration range from about 0.5 to about 4 wt. %, or any other suitable concentration range. The wetting agent can be injected into the subterranean formation 104 via the interval of the wellbore 102 and may prime or otherwise interact with solids in the subterranean formation 104, or other suitable components of the wellbore 102, for enhancing a coating of subsequently injected fluids. For example, a curable resin may be injected into the subterranean formation subsequent to the aqueous pre-flush solution with the wetting agent, via the interval of the wellbore 102, and a coating of the curable resin with respect to the solids of the subterranean formation 104 may be enhanced (e.g., compared to the curable resin injected into a wellbore that does not include a prior-injected wetting agent) due to the wetting agent.

Additionally or alternatively, the docking agent can be included in the aqueous pre-flush fluid for causing the curable resin to adhere to the subterranean formation 104. For example, the docking agent (e.g., individually, via the brine pre-flush, etc.) can be injected into the subterranean formation 104 via the interval of the wellbore 102 and may prime or otherwise interact with solids in the subterranean formation 104, or other suitable components of the wellbore 102, for enhancing adhesive properties of the subterranean formation 104. The curable resin may be subsequently injected into the subterranean formation via the interval of the wellbore 102, and adhesion of the curable resin with respect to the solids of the subterranean formation 104 may be enhanced (e.g., compared to the curable resin injected into a wellbore that does not include a prior-injected docking agent) due to the docking agent. In some examples, the docking agent can be any suitable docking agent from a class of alkylamino silane materials or otherwise include an alkylamino silane material.

At block 204, a solids-control fluid is injected into the interval of the wellbore 102. The solids-control fluid may include a diluent and a solids-control agent. The diluent can include a glycol ether such as polyalkylene glycol monobutyl ether, monoethylene glycol, ethylene glycol monobutyl ether, other suitable components for the diluent, or a combination thereof. Additionally or alternatively, the solids-control fluid can include a resin, such as polymeric furfuryl resin mixture, the docking agent, wetting agent, or other suitable fluids for improving a control of a flow of solids in the subterranean formation 104.

Table 1 illustrates a comparison of solids-control fluids with various diluents. The solids-control fluids can have a solids-control agent mixed with the diluents, such as a furfuryl-alcohol-based resin mixture. The diluents may be tested on sand packs with clay contents of less than 5%, less than 10%, and greater than 20%. An initial permeability of the sand pack to brine is included in table 1, which decreases for increased clay content. The initial permeability can be a control for measuring a regain in permeability to brine, which can be indicative of damage caused by the solid control fluids to the clay content of the sand pack. Additionally, Table 1 includes an average unconfined consolidation strength (UCS) for each of the diluents with respect to each of the clay contents. The UCS can be a maximum axial compressive stress that a cohesive soil specimen, such as the sand pack, can withstand under zero confining stress such as prior to deformation of the sand pack.

TABLE 1

| Sand Pack Clay Content % | Sand Pack initial Permeability to Brine (Darcy) | Diluent | AVE UCS (PSI) | Regain Permeability to Brine (%) |
|---|---|---|---|---|
| <5% | 1.5 | furfural | 765 | 65 |
| | | EGMBE/MEG | 800 | 70 |
| | | PAGME/MEG | 1100 | 85 |
| <10% | 0.7 | furfural | 216 | 55 |
| | | EGMBE/MEG | 150 | 60 |
| | | PAGMBE/MEG | 800 | 80 |
| >20% | 0.145 | furfural | 200 | <15 |
| | | EGMBE/MEG | 0 | 0 |
| | | PAGMBE/MEG | 1031 | >85 |

Based on Table 1, solids-control fluid with a first diluent including polyalkylene glycol monobutyl ether and monoethylene glycol may maintain a high UCS for clay contents above 5%, while solids-control fluids with a second diluent including furfural and a third diluent consisting of ethylene glycol monobutyl ether and monoethylene glycol exhibited decreased UCS. Thus, the use of polyalkylene glycol monobutyl ether, or other glycol ethers, in solid-control fluids can maintain an integrity of the subterranean formation to facilitate improved control of the flow of solids in the subterranean formation 104.

The diluent, such as polyalkylene glycol monobutyl ether, can have a cloud point that involves condensing on the wall of the subterranean formation 104. Additionally or alternatively, the cloud point can be a temperature, salinity, or the like at which a solution changes phase (e.g., from solid to liquid) or at which a solution separates (e.g., liquid-liquid phase separation). As a function of temperature, salinity, or a combination thereof, the polyalkylene glycol monobutyl ether can become less soluble in the solids-control fluid and subsequently deposit out of the subterranean formation 104. In some examples, at a particular temperature and at a particular salinity associated with the cloud point profile of polyalkylene glycol monobutyl ether, the polyalkylene glycol monobutyl ether can precipitate onto the subterranean formation, thereby protecting the subterranean formation from damage, enhancing an affinity of the solids-control agent to a surface of the subterranean formation to cause the solids-control agent to adhere to the surface of the subterranean formation, or a combination thereof. Additionally, the precipitation of a glycol ether at the cloudpoint can cause consolidation of the particulates, thereby further causing the particulates to maintain a current position.

Table 2 illustrates results of Capillary Suction Time testing on solids-control fluids with various diluents. In Table 2, a lower swelling factor can be associated with less damage to clay minerals. Table 2 may further indicate that polyalkylene glycol monobutyl ether can mitigate damage to the clay of the sand packs to facilitate efficient control of the flow of solids from the subterranean formation. Additionally, mitigating damage to the clay can assist in maintaining the integrity of the wellbore 102, subterranean formation 104, or a combination thereof.

TABLE 2

| Test No. | % Clay Content | Fluid | Swelling Factor* |
| --- | --- | --- | --- |
| 1 | 5 | 15 wt % NaCl brine | 10 |
| 2 |  | Houston TAP Water | 150 |
| 3 |  | EGMGE/MEG | 400 |
| 4 |  | PAGMGE/MEG | 100 |

Additionally, the solids-control agent of the solids-control fluid can be positioned in the subterranean formation 104 for controlling a flow or a migration of solids (e.g., sand, fine particulates, and the like) with respect to the wellbore 102. The solids-control agent can include a curable resin, such as a furfuryl-alcohol-based resin or other suitable type of resin, a tackifying agent, or other suitable solids-control agent. The curable resin can be used to control sand, fine particulates, clays or a combination thereof in the subterranean formation 104. For example, a first concentration or ratio of the curable resin can be used to control sand in the subterranean formation 104, and a second concentration or ratio of the curable resin can be used to control flow of fines in the subterranean formation 104, etc. The tackifying agent can be used to control migration of fine particulates in the subterranean formation 104. For example, the tackifying agent may tack, or adhere, the fine particulates into-place in the subterranean formation 104 for mitigating the migration of fines in the subterranean formation 104. The solids-control agent may combine with, adhere to, coat, or otherwise interact with solids of the subterranean formation 104 for preventing a critical flow or critical velocity, which may cause the solids to dislodge or be produced from the subterranean formation 104, from being achieved. In some examples, the solids-control agent, using the diluent, can additionally clean the wellbore 102 or the subterranean formation 104.

In some examples, an aqueous spacer fluid can be injected into the interval of the wellbore 102. The spacer fluid can include brine, or other suitable base-fluid, a wetting agent, such as a surfactant, and other suitable components for a spacer fluid. The spacer fluid may be injected into the subterranean formation 104 or otherwise be positioned to provide a spacer function for the solids-control fluid. For example, the spacer fluid may be injected into the interval of the wellbore 102 for preventing or delaying contact between the solids-control fluid and a catalytic element that may cause the solids-control fluid to consolidate or otherwise activate. The spacer fluid can be injected into the interval of the wellbore 102 for performing other suitable operations or tasks with respect to the well system 100.

At block 206, an aqueous post-flush fluid that includes a solids-control fluid activator is injected into the interval of the wellbore 102 to cause the solids-control fluid to consolidate in the subterranean formation 104. The post-flush fluid can include, in addition to the solids-control fluid activator, a brine, or other suitable base-fluid, a wetting agent, other suitable components for the post-flush fluid, or any suitable combination thereof. The solids-control fluid activator can be a catalytic agent and may include a curing agent such as a resin curing activator. In an example in which the solids-control fluid activator is the catalytic agent, injecting the aqueous post-flush fluid can expose the solids control-agent to the catalytic agent to cause the solids-control fluid to consolidate in the subterranean formation 104. In some examples, the solids-control fluid activator may be injected into the wellbore 102 separately from (e.g., prior to) injecting the aqueous post-flush fluid into the wellbore 102.

In some examples, the solids-control fluid activator may mix with or otherwise contact the solids-control fluid for activating the solids-control fluid. By activating, the solids-control fluid may consolidate or perform other suitable functions for controlling solids in the subterranean formation 104. For example, activating the solids-control fluid can involve causing the solids-control fluid to consolidate for preventing, or mitigating an amount of, the solids from reaching a critical flow. Additionally or alternatively, the solids-control fluid can be activated to control proppant flow-back in the wellbore 102. In some examples, upon activation of the solids-control fluid, or in other suitable situations, the diluent may be produced or otherwise extracted from the subterranean formation 104. The diluent may be produced, but the solids-control agent may remain activated and in the subterranean formation 104.

In an example, injecting the solid-control fluid activator in the aqueous post-flush solution can activate the curable resin. In the example, the solid-control fluid activator can be a resin activator and can include an aqueous halogenated amine acid salt mixture. Additionally, the curable resin can be or include a polymeric furfuryl-alcohol resin mixture. In the example, a ratio of the solids-control fluid activator to the curable resin can be equal to or less than about 5:1. In some examples, other solid-control fluid activators, other curable resins or solid-control fluid agents, or another suitable ratio can be used to cause the solids-control fluid to consolidate in the subterranean formation 104.

In some examples, more than one interval, such as a set of intervals, in the wellbore 102 can be isolated for controlling the flow of solids in the wellbore 102. The set of intervals can be isolated using a set of packers or other suitable devices for isolating the set of intervals in the wellbore 102. The aqueous post-flush fluid (e.g., injected into the wellbore 102 at the block 206) may be injected into the set of intervals subsequent to the injection of a set of repeating stages of the aqueous pre-flush fluid, the solids-control fluid, or aqueous spacer fluid. For example, an injection sequence can include the solids-control fluid and then the aqueous spacer fluid. The injection sequence can be performed a predetermined amount of times such as two times, three times, four times, or more. In some examples, the predetermined amount of times may correspond to the number of intervals in the set of intervals. Subsequent to performing the injection sequence the predetermined amount of times, the aqueous post-flush fluid can be injected into the wellbore 102 for activating the solids-control fluid.

Figure 3:
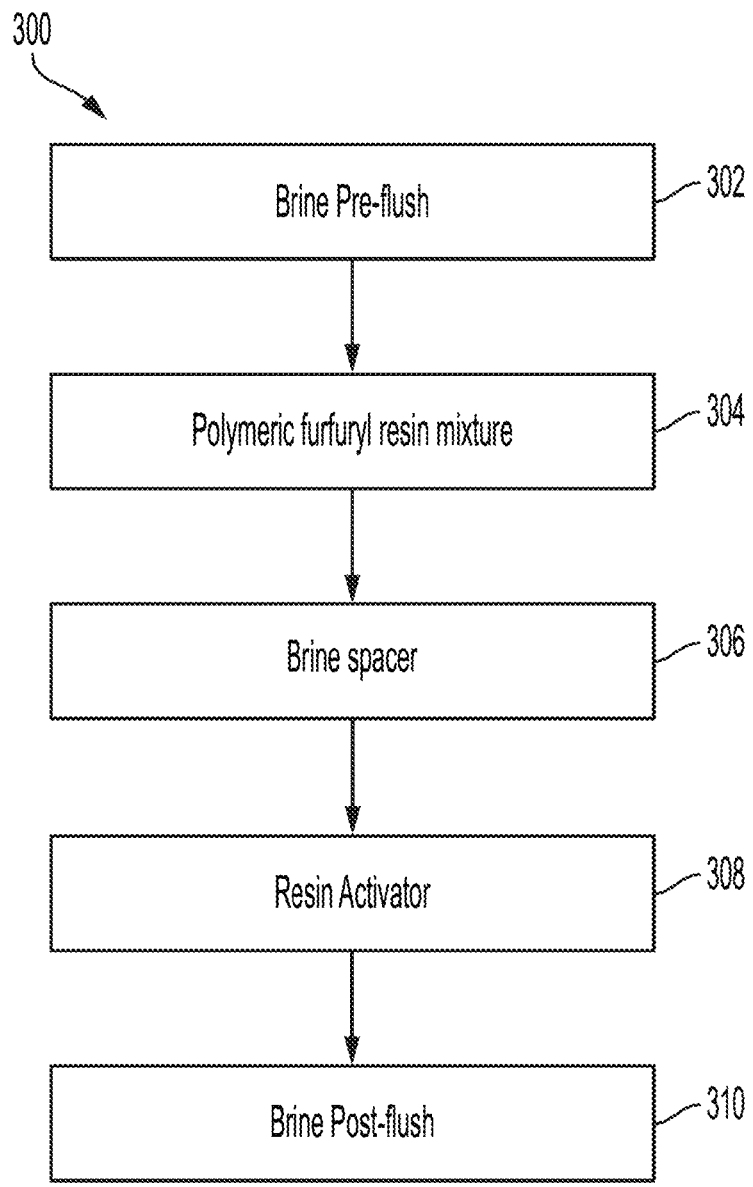
FIG. 3 is a flowchart of a process to treat a wellbore with a solids-control fluid that includes a diluent having a glycol ether according to examples of the present disclosure.

FIG. 3 is a flowchart of a process 300 to treat a wellbore 102 with a solids-control fluid that includes a diluent having a glycol ether according to examples of the present disclosure. At block 302, a brine pre-flush is prepared. The brine pre-flush can be injected into the wellbore as an aqueous pre-flush fluid to prepare an interval of a wellbore 102 for a subsequent injection of a solids-control fluid. For example, the brine pre-flush may mitigate damage to the subterranean formation 104 during injection or activation of the solids-control fluid or may cause improved adhesion between a solids-control agent of the solids-control fluid and the subterranean formation.

In some examples, the brine pre-flush can include a greater than 1 M concentration of a halogenated Group I metal salt. Additionally, in some examples, the brine pre-flush can include a 2.7 M concentration of aqueous sodium chloride. The brine pre-flush fluid may further include a wetting agent. Examples of wetting agents can include quaternized alkyl amine salts, quaternized polyamine salts, or other suitable wetting agents that can that render the subterranean formation 104 oil-wet.

At block 304, a polymeric furfuryl resin mixture is prepared. The polymeric furfuryl resin mixture can be similar or identical to the solids-control agent and can be part of the solids-control fluid along with a diluent. The polymeric furfuryl resin mixture can control a flow or a migration of solids, such as sand, fine particulates, clays, and the like, with respect to the wellbore 102. For example, polymeric furfuryl resin mixture may combine with, adhere to, coat, or otherwise interact with solids of the subterranean formation 104 to prevent a critical flow or a critical velocity, which may cause the solids to dislodge or be produced from the subterranean formation 104, from being achieved.

The diluent can include monoethylene glycol, a polyalkylene glycol material, such as polyalkylene glycol monobutyl ether, other glycol ethers, or a combination thereof. In a particular example, the diluent can include polyalkylene glycol and monoethylene glycol, in which a ratio of polyalkylene glycol to monoethylene glycol can be 7:3. Additional diluent components may include an aromatic aldehyde (e.g., benzaldehyde, anisaldehyde, trimethoxy benzaldehyde, halogenated benzaldehyde), a heteroaromatic aldehyde (e.g., furfural, pyridine carboxaldehyde, pyrrole carboxaldehyde, thiophene carboxaldehyde, furan carboxaldehyde, etc.), an aromatic alcohol acetate ester (e.g., phenyl acetate, furfuryl alcohol acetate, etc.), an alkyl acetate ester (e.g., butyl acetate, hexyl acetate, etc.), an aromatic alcohol (e.g., phenol, hydroxypyridine, benzyl alcohol, furfuryl alcohol, pyridinemethanol, etc.), an aromatic ester (e.g., benzyl benzoate, etc.), an ether alcohol mixture (e.g., monoalkyl ethylene glycol, monobutyl ethylene glycol, polyethyleneglycol monobutyl ether, etc.), ethylene glycol derivatives (monoethyl glycol, polyethylene glycol, etc.), or a combination thereof.

At block 306, a brine spacer is prepared. The brine spacer may be injected into the subterranean formation 104 or otherwise be positioned to provide a spacer function for the solids-control fluid. For example, the spacer fluid may be injected into the interval of the wellbore 102 to prevent or delay contact between the solids-control fluid and the polymeric furfuryl alcohol resin mixture that may cause the solids-control fluid to consolidate or otherwise activate. The brine spacer can include a greater than 1 M concentration of a halogenated Group I metal salt.

At block 308, a resin activator is prepared. The resin activator may cause the polymeric furfuryl alcohol resin mixture to consolidate or otherwise activate for controlling solids in the interval of the wellbore. The resin activator can include an aqueous halogenated amine acid salt mixture. The aqueous halogenated amine acid salt can include an alkanolamine (e.g., monoethanolamine, monoisopropylamine, diethanolamine, triethanolamine, tetraethanol ethylene diamine, etc) and a mineral acid (e.g., hydrochloric acid, sulfuric acid, phosphoric acid, nitric acid, etc.) In some examples, a molar ratio of acid to alkanolamine in the aqueous halogenated amine acid salt mixtures can be about 16:1 or the molar ratio of acid to alkanolamine can be another suitable ratio.

Additionally or alternatively, the aqueous halogenated amine acid salt mixture can further include an anti-corrosive formulation, an anti-corrosive additive intensifier, or a combination thereof. The anti-corrosion additives may be acetylenic alcohols, aromatic or aliphatic aldehydes, alkylphenones, alkylated bisphenol compounds, amides, amines, quaternary amine salts, amine substituted heterocycles, imines, iminium salts, triazoles, pyridine and or pyridinium derivatives, quinoline and quinoline analogs, thiourea-based compounds, thiosemicarbazides, and thiocyanates, other suitable anti-corrosion additive, or a combination thereof. Additionally, the anti-corrosive additive intensifier can be formic acid, potassium iodide, antimony oxide, copper iodide, sodium iodide, lithium iodide, aluminum chloride, bismuth oxide, calcium chloride, magnesium chloride, other suitable anti-corrosive additive intensifiers, or combination thereof. Additionally, at block 310, the post-brine flush can optionally be prepared and injected into the wellbore 102.

Figure 4:
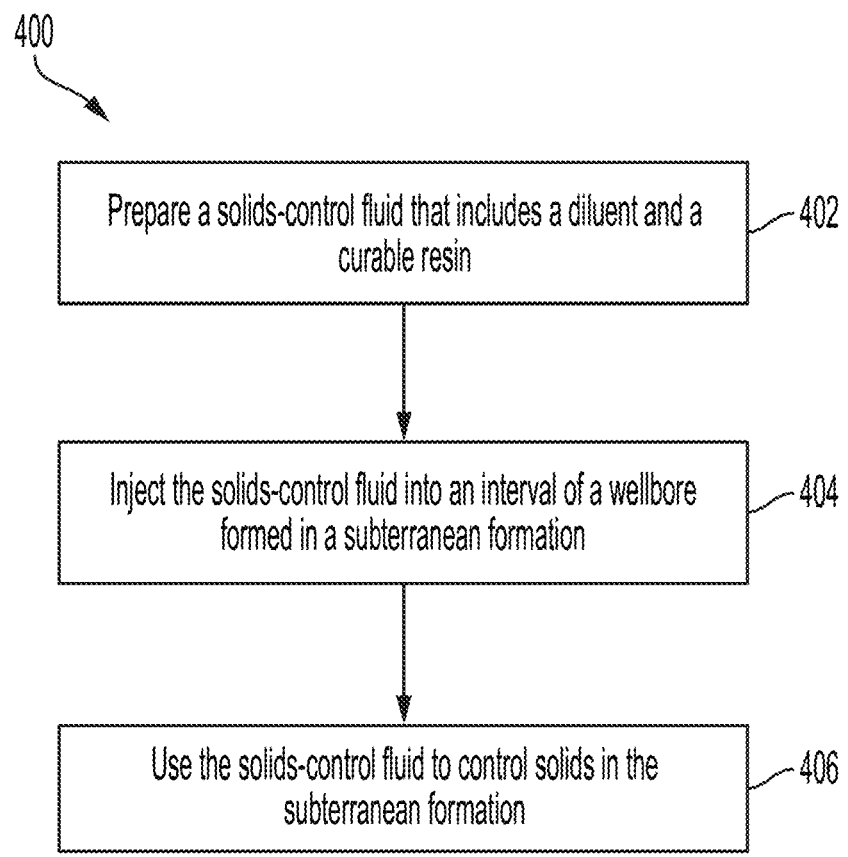
FIG. 4 is a flowchart of a process to control flow of solids using a solids-control fluid that includes a diluent and a curable resin according to examples of the present disclosure.

FIG. 4 is a flowchart of a process to control flow of solids using a solids-control fluid that includes a diluent and a curable resin according to examples of the present disclosure. At block 402, a solids-control fluid is prepared. The solids-control fluid can include a diluent and a curable resin. The curable resin can be a furfuryl-alcohol-based resin or other suitable resin that can be used for controlling flow or migration of solids in the wellbore 102. The diluent can include a glycol ether material (e.g., polyalkylene glycol monobutyl ether), an ethylene glycol, or a combination thereof. In some examples, the solids-control fluid can additionally include a wetting agent, a docking agent, a coupling agent, or other suitable components for enhancing performance of the curable resin. For example, the wetting agent may improve (e.g., compared to a solids-control fluid without the wetting agent) spreading and penetration of the curable resin in the subterranean formation 104, and the coupling agent may improve (e.g., compared to a solids-control fluid without the coupling agent) adherence of the curable resin to solids of the subterranean formation 104.

The solids-control fluid can be batch-mixed, such as mixed prior to injecting into the wellbore 102, or the solids-control fluid can be mixed on the fly or otherwise while positioning the solids-control fluid in the wellbore 102. One or more ratios of components of the solids-control fluid can be observed while preparing the solids-control fluid. For example, with respect to the diluent, a ratio of the polyalkylene glycol monobutyl ether to the ethylene glycol may be 7:3. Other ratios of the polyalkylene glycol monobutyl ether to the ethylene glycol can be created. Additionally, in one particular example, the ratio of the diluent to the curable resin can be about 1:1. Any other suitable ratios of the diluent to the curable resin can be used for controlling solids in the subterranean formation 104. In some examples, the solids-control fluid can be pre-packed with sand or other solids, which may be included in the subterranean formation 104, for increasing an effectiveness of the solids-control fluid.

At block 404, the solids-control fluid is injected into the wellbore 102. The prepared solids-control fluid can be injected into the subterranean formation 104 via interval 101 of the wellbore 102. In some examples, a pre-flush fluid including a wetting agent may be injected into the interval 101 of the wellbore 102 prior to injecting the solids-control fluid into the subterranean formation 104. The solids-control fluid may spread or otherwise penetrate the subterranean formation 104 and may adhere to solids, such as sand, fine particulates, clays, or the like, in the subterranean formation 104.

At block 406, the solids-control fluid is used to control solids in the subterranean formation 104. In some examples, the solids-control fluid having a first concentration of, or ratio involving, the curable resin can control sand in the subterranean formation 104, and the solids-control fluid having a second concentration of, or ratio involving, the curable resin can control fines in the subterranean formation 104. Other ratios for controlling other types or combinations of fluids are possible. A post-flush fluid having a catalytic agent can be injected into the subterranean formation 104. The solids-control fluid can contact the catalytic agent, and the catalytic agent may cause the solids-control fluid to activate. In response to the solids-control fluid activating, the curable resin may consolidate or otherwise activate to control the solids in the subterranean formation 104, and the diluent may be produced or otherwise extracted from the subterranean formation 104. The diluent may be produced, but the activated curable resin may be retained in the subterranean formation 104 for controlling the solids.

In some aspects, solid-control fluids including diluents and methods for controlling flow of solids in a subterranean formation are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a method comprising: isolating an interval of a wellbore that is formed in a subterranean formation; injecting a solids-control fluid into the interval of the wellbore, the solids-control fluid comprising a solids-control agent and a diluent that comprises a glycol ether; and injecting an aqueous post-flush fluid that includes a solids-control fluid activator into the interval of the wellbore for causing the solids-control fluid to consolidate in the subterranean formation.

Example 2 is the method of example(s) 1, wherein the solids-control agent comprises a polyalkylene glycol.

Example 3 is the method of example(s) 1, wherein the solids-control agent includes a curable resin, wherein the curable resin includes a furfuryl-alcohol based curable resin, and wherein injecting the aqueous post-flush fluid includes injecting the solids-control fluid activator for activating the curable resin.

Example 4 is the method of example(s) 1, wherein the solids-control fluid further comprises a docking agent for adhering the solids-control agent to the subterranean formation, wherein the docking agent includes at least an alkylamino silane material.

Example 5 is the method of example(s) 1, wherein the solids-control fluid activator is a catalytic agent, and wherein injecting the aqueous post-flush fluid into the interval of the wellbore includes exposing the solids-control agent to the catalytic agent.

Example 6 is the method of example(s) 1, wherein, at a particular temperature and at a particular salinity, the glycol ether has a cloud point, wherein the glycol ether, at the cloud point, precipitates onto the subterranean formation for causing the solids-control agent to adhere to a surface of particulates of the subterranean formation and for causing consolidation of the particulates.

Example 7 is the method of example(s) 1, wherein introducing the aqueous post-flush fluid that includes the solids-control fluid activator into the interval of the wellbore further comprises extracting the diluent from the subterranean formation while retaining the solids-control agent in the subterranean formation.

Example 8 is the method of example(s) 1, wherein the subterranean formation includes a clay content of at least five percent, and wherein the method further comprises injecting an aqueous pre-flush fluid into the interval of the wellbore for preparing the interval of the wellbore for the solids-control fluid, wherein the aqueous pre-flush fluid includes a brine.

Example 9 is the method of example(s) 1, wherein the solids-control fluid further comprises polyalkylene glycol monobutyl ether and monoethylene glycol, wherein the solids-control fluid has a first ratio of the diluent to the solids-control agent to control flowback of sand from the subterranean formation, wherein the first ratio of the diluent to the solids-control agent is about 1:1, and wherein the solids-control fluid has a second ratio of the polyalkylene glycol monobutyl ether to the monoethylene glycol, wherein the second ratio of the polyalkylene glycol monobutyl ether to the monoethylene glycol is about 7:3.

Example 10 is a solids-control fluid comprising: a solids-control agent; a diluent comprising glycol ether; and a curable resin dispersed within the diluent for controlling flow of solids in a subterranean formation.

Example 11 is the solids-control fluid of example(s) 10, wherein the solids-control agent comprises a polyalkylene glycol.

Example 12 is the solids-control fluid of example(s) 10, wherein the curable resin includes a furfuryl-alcohol based curable resin, and wherein the diluent is removable from the solids-control fluid subsequent to activating the curable resin via a catalytic agent.

Example 13 is the solids-control fluid of example(s) 10, wherein the solids-control fluid has a first ratio of the diluent to the curable resin to control flowback of sand from the subterranean formation, wherein the first ratio of the diluent to the curable resin is about 1:1.

Example 14 is the solids-control fluid of example(s) 10, wherein the solids-control fluid further comprises monoethylene glycol and polyalkylene glycol monobutyl ether, and wherein the solids-control fluid has a second ratio of the polyalkylene glycol monobutyl ether to the monoethylene glycol, wherein the second ratio of the polyalkylene glycol monobutyl ether to the monoethylene glycol is about 7:3.

Example 15 is the solids-control fluid of example(s) 13, wherein, at a particular temperature and at a particular salinity, the polyalkylene glycol monobutyl ether has a cloud point, wherein the polyalkylene glycol monobutyl ether, at the cloud point, is precipitable onto a subterranean formation associated with a wellbore in which the solids-control fluid was introduced.

Example 16 is the solids-control fluid of example(s) 10, wherein the solids-control fluid further comprises a docking agent for increasing adhesion of the curable resin to the subterranean formation.

Example 17 is a solids-control fluid comprising: a solids-control agent; a diluent comprising glycol ether; and a furfuryl-alcohol resin dispersed within the diluent for controlling flowback of solids from a subterranean formation.

Example 18 is the solids-control fluid of example(s) 17, wherein the solids-control agent comprises a polyalkylene glycol.

Example 19 is the solids-control fluid of example(s) 17, wherein the solids-control fluid has a first ratio of the diluent to the furfuryl-alcohol resin to control flowback of sand from the subterranean formation, wherein the first ratio of the diluent to the furfuryl-alcohol resin is about 1:1.

Example 20 is the solids-control fluid of example(s) 17, wherein the solids-control fluid further comprises monoethylene glycol and polyalkylene glycol monobutyl ether, and wherein the solids-control fluid has a second ratio of the polyalkylene glycol monobutyl ether to the monoethylene glycol, wherein the second ratio of the polyalkylene glycol monobutyl ether to the monoethylene glycol is about 7:3.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method comprising:
    isolating an interval of a wellbore that is formed in a subterranean formation;
    injecting a solids-control fluid into the interval of the wellbore, the solids-control fluid comprising a solids-control agent and a diluent that comprises monoethylene glycol and polyalkylene glycol monobutyl ether; and
    injecting an aqueous post-flush fluid that comprises a solids-control fluid activator into the interval of the wellbore for causing the solids-control fluid to consolidate in the subterranean formation.

2. The method of claim 1, wherein the solids-control agent comprises a curable resin, wherein the curable resin comprises a furfuryl-alcohol based curable resin, and wherein injecting the aqueous post-flush fluid comprises injecting the solids-control fluid activator for activating the curable resin.

3. The method of claim 1, wherein the solids-control fluid further comprises a docking agent for adhering the solids-control agent to the subterranean formation, wherein the docking agent comprises at least an alkylamino silane material.

4. The method of claim 1, wherein the solids-control fluid activator is a catalytic agent, and wherein injecting the aqueous post-flush fluid into the interval of the wellbore comprises exposing the solids-control agent to the catalytic agent.

5. The method of claim 1, wherein, at a particular temperature and at a particular salinity, the polyalkylene glycol monobutyl ether has a cloud point, wherein the polyalkylene glycol monobutyl ether, at the cloud point, precipitates onto the subterranean formation for causing the solids-control agent to adhere to a surface of a set of particulates of the subterranean formation and for causing consolidation of particulates included in the set particulates.

6. The method of claim 1, wherein introducing the aqueous post-flush fluid that comprises the solids-control fluid activator into the interval of the wellbore further comprises extracting the diluent from the subterranean formation while retaining the solids-control agent in the subterranean formation.

7. The method of claim 1, wherein the subterranean formation comprises a clay content of at least five percent, and wherein the method further comprises injecting an aqueous pre-flush fluid into the interval of the wellbore for preparing the interval of the wellbore for the solids-control fluid, wherein the aqueous pre-flush fluid comprises a brine.

8. The method of claim 1, wherein the solids-control fluid has a first ratio of the diluent to the solids-control agent to control flowback of sand from the subterranean formation, wherein the first ratio of the diluent to the solids-control agent is about 1:1, and wherein the solids-control fluid has a second ratio of the polyalkylene glycol monobutyl ether to the monoethylene glycol, wherein the second ratio of the polyalkylene glycol monobutyl ether to the monoethylene glycol is about 7:3.

9. A solids-control fluid comprising:
    a solids-control agent;
    a diluent comprising monoethylene glycol and polyalkylene glycol monobutyl ether; and
    a curable resin dispersed within the diluent for controlling flow of solids in a subterranean formation, wherein a spacer fluid and an aqueous post-flush fluid are injectable into at least a portion of a wellbore for causing the solids-control fluid to consolidate in the subterranean formation.

10. The solids-control fluid of claim 9, wherein the curable resin comprises a furfuryl-alcohol based curable resin, and wherein the diluent is removable from the solids-control fluid subsequent to activating the curable resin via a catalytic agent.

11. The solids-control fluid of claim 9, wherein the solids-control fluid has a first ratio of the diluent to the curable resin to control flowback of sand from the subterranean formation, wherein the first ratio of the diluent to the curable resin is about 1:1.

12. The solids-control fluid of claim 9, wherein the solids-control fluid has a ratio of the polyalkylene glycol monobutyl ether to the monoethylene glycol, wherein the ratio of the polyalkylene glycol monobutyl ether to the monoethylene glycol is about 7:3.

13. The solids-control fluid of claim 12, wherein, at a particular temperature and at a particular salinity, the polyalkylene glycol monobutyl ether has a cloud point, wherein the polyalkylene glycol monobutyl ether, at the cloud point, is precipitable onto a subterranean formation associated with a wellbore in which the solids-control fluid was introduced.

14. The solids-control fluid of claim 9, wherein the solids-control fluid further comprises a docking agent for increasing adhesion of the curable resin to the subterranean formation.

15. A solids-control fluid comprising:
a solids-control agent;
a diluent comprising monoethylene glycol and polyalkylene glycol monobutyl ether; and
a furfuryl-alcohol resin dispersed within the diluent for controlling flowback of solids from a subterranean formation, wherein a spacer fluid and an aqueous post-flush fluid are injectable into at least a portion of a wellbore for causing the solids-control fluid to consolidate in the subterranean formation.

16. The solids-control fluid of claim 15, wherein the solids-control fluid has a first ratio of the diluent to the furfuryl-alcohol resin to control flowback of sand from the subterranean formation, wherein the first ratio of the diluent to the furfuryl-alcohol resin is about 1:1.

17. The solids-control fluid of claim 15, wherein the solids-control fluid has a ratio of the polyalkylene glycol monobutyl ether to the monoethylene glycol, wherein the ratio of the polyalkylene glycol monobutyl ether to the monoethylene glycol is about 7:3.

* * * * *